United States Patent [19]

Mattelin

[11] Patent Number: 4,725,709

[45] Date of Patent: Feb. 16, 1988

[54] APPARATUS HAVING A SWEEP ARRANGEMENT FOR NON-CONTACTING MODIFICATION OF AN ARTICLE

[75] Inventor: Antoon Mattelin, Oostkamp, Belgium

[73] Assignee: Siemens Aktiengesellschaft, Berlin and Munich, Fed. Rep. of Germany

[21] Appl. No.: 774,581

[22] Filed: Sep. 10, 1985

[30] Foreign Application Priority Data

Sep. 25, 1984 [DE] Fed. Rep. of Germany ....... 3435191

[51] Int. Cl.⁴ ............................................. B23K 26/00
[52] U.S. Cl. ..................... 219/121 LW; 219/121 LM; 219/121 LU; 219/121 L; 350/6
[58] Field of Search ................. 219/121 LU, 121 LV, 219/121 LW, 121 LH, 121 LJ, 121 L, 121 LM, 121 LR; 350/6, 288, 289, 299

[56] References Cited

U.S. PATENT DOCUMENTS

| | | | |
|---|---|---|---|
| 3,848,104 | 11/1974 | Locke | 219/121 LW |
| 3,920,951 | 11/1975 | Chovan et al. | 219/121 LW |
| 3,965,327 | 6/1976 | Ehlscheid et al. | 219/121 LW |
| 4,177,372 | 12/1979 | Kotera et al. | 219/121 LW |
| 4,480,169 | 10/1984 | Macken | 219/121 LW |
| 4,539,481 | 9/1985 | Troukens et al. | 219/121 LW |
| 4,564,739 | 1/1986 | Mattelin | 219/121 LW |

FOREIGN PATENT DOCUMENTS

3145278 5/1983 Fed. Rep. of Germany .

*Primary Examiner*—M. H. Paschall
*Attorney, Agent, or Firm*—Hill, Van Santen, Steadman & Simpson

[57] ABSTRACT

An apparatus for non-contacting modification of the surface of an article such as for labeling a glass article, characterized by a laser beam, a sweep device for deflecting the laser beam as a swept beam in a given path, a deflection device separate from the sweep device for deflecting the swept beam in a desired path for forming a label on the surface of the article. Due to the separation of the deflection device and sweep device, the sweep device can be constructed as small as possible with a low moment of inertia for the movable parts to enable obtaining significantly higher sweep frequencies. As a result, a high sweep frequency, preferably in amounts of at least 500 Hz, can be obtained and a sharp edge erosion without macroscopic splintering is guaranteed during the labeling of a glass article with the apparatus.

10 Claims, 5 Drawing Figures

APPARATUS HAVING A SWEEP ARRANGEMENT FOR NON-CONTACTING MODIFICATION OF AN ARTICLE

BACKGROUND OF THE INVENTION

The present invention is directed to an apparatus for non-contacting modification of a surface of a glass article by taking a laser beam from a laser, passing it through a sweep device to create a swept beam, deflecting the swept beam by a deflection device to create a labeling beam moving in a desired path and focusing or directing the labeling beam on the glass surface by an objective lens so that the label is created on the glass surface of the glass article.

In laser labeling of articles, an apparatus is utilized in which a beam from a laser is passed through a photographic shutter to a deflection device or means which is controllable in accordance with the particular labeling job by a process computer or microprocessor. The deflected beam is passed through an objective which focuses the beam onto the surface of the article which is to be labeled. Articles of metal, ceramic and semiconductor materials and a multitude of synthetic materials can then be labeled by the laser labeling with letters, numerals, marks, company symbols, and logos or graphic illustrations which are part of the labeling job. The labeling can therefore be executed with an engraving script, fusing script and an evaporation script or by means of discoloration of the surface. The deflection device or means of the known apparatus is composed of a first deflecting mirror for deflecting the laser beam in a first direction such as the x-direction and a second deflecting mirror for deflecting the beam perpendicular to the first direction such as in a y-direction. Both deflecting mirrors are designed as galvanometer mirrors. These galvanometer mirrors are distinguished by a low amount of inertia of the movable parts. At the same time, the deflection device also fulfills the task of a sweep means by means of which the laser beam was swept such as in a horizontal and vertical direction to describe a circle on the surface of the article to be labeled and the sweep means will define the stroke thickness of the labeling device. To this end, the coil for the galvanometer mirrors supplied with the voltage $Ux = -\sin \omega t$ for the horizontal deflection and a coil for the galvanometer mirror is supplied with the voltage $Uy = -\sin(\omega t + \alpha)$ for the vertical or y-deflection so that the sweep frequency is referenced $\omega$, the time is referenced $t$ and the angle of the phase shift is referenced $\alpha$. The angle $\alpha$ is set such that the laser beam describes a circle on the surface of the article to be labeled. The sweep frequencies, which are obtainable with the combined deflection and sweep device, are at a maximum of 100 to 150 Hz.

Given the employment of the known apparatus for labeling, decorating or marking glass, macroscopic splinters will occur in the edge region of the swept laser beam. These splinters have a considerable negative effect on the optical appearance image and in addition lead to injuries under certain conditions.

In order to be able to apply letters, numerals, marks, calibration strokes, company symbols or logos, graphic illustrations and ornamentations to articles of glass in a high-grade quality by means of a laser beam, other ways were therefore sought. One method which is disclosed in German OS No. 31 45 278 uses a non-contacting erosion of material from the surface of an article of glass wherein the laser beam is conducted through a partially absorbing matrix and is divided into a plurality of subbeams in order to achieve a shaped-edge erosion without splintering. The energy available in the laser beam is therefore divided in the beam cross-section and the subbeams can be adapted to a desired erosion. However, a mask must be disposed between the laser and the workpiece with the mask defining the shape of the labeling, marking or symbol. The high flexibility of the apparatus having a laser beam controllable in accordance with the labeling job can therefore not be achieved with this device.

SUMMARY OF THE INVENTION

The present invention is directed to an improved apparatus for non-contacting modification of a surface of an article, such as by applying letters, numerals, marks, calibration strokes, company symbols and logos, graphic illustrations and ornamentations onto articles of glass with a high-grade quality. The object is inventively achieved by an apparatus comprising a laser creating a laser beam, sweep means being disposed in the path of a laser beam for creating a swept beam, deflecting means being disposed in the path of the swept beam for creating a labeling beam moving in a desired path and lens means for focusing the labeling beam on the surface of the glass article to create the label thereon. It is important to note, that the sweep means is separated from the deflection means and is disposed in the beam path of the laser beam preceding the deflecting means.

The invention is based on the perception that macroscopic splinters in the edge region during noncontacting modification of the surface of an article of glass can only be avoided by increasing the sweep frequencies. Since deflection mirrors having a certain minimum size must be utilized in the deflection device in order to achieve the required deflection angle for the laser beam, the moments of inertia of the movable parts are so high that the increase in the sweep frequency, which increase is required for articles of glass, cannot be achieved with the previously known and employed combined deflection and sweep devices. By employing separate sweep devices, which only require very small deflection angles and the deflection mirrors and which have drives which can be miniaturized to such a degree, a significantly higher sweep frequencies can be realized and in particular, a resonant mode is also enabled by means of a corresponding reduction in the moments of inertia of each of the movable parts. This structural separation of the sweep means and the deflection means, however, then leads to considerable advantages even given articles composed of materials other than glass. When, for example, labeling articles of plastic, a chemical density and overlap of the resultant loop curves can be achieved due to an increased sweep frequencies and this increased density and overlap enable an increase in the labeling speed and, at the same time, enable a realization of line thicknesses which are thicker.

The sweep device or means can be composed of two deflecting mirrors disposed successively in the beam path of the laser beam and rotatable in various directions with different sweep frequencies. This sweep device thus corresponds to a miniaturized embodiment of the standard deflection device.

The sweep device or means, however, can also be composed of a single deflecting mirror rotatable at different sweep frequencies in two mutually independent directions. The second deflecting mirror can thus be eliminated.

In accordance with the preferred development of the invention, the sweep frequency can be set to be at least 500 Hz. Such sweep frequencies of at least 500 Hz enable the laser labeling of articles of glass or of a comparatively brittle material with an extremely high-grade quality.

The sweep means or device is preferably adjustable so that the laser beam describes a circle on the surface of the article. This circular form enables uniform line thicknesses in all directions. When laser labeling articles of glass, the diameter of the circle is preferably set to be at least 0.5 mm. For good legibility of the laser labeling, it has been proven very beneficial when the diameter of the circle is set to about 1 mm.

DESCRIPTION OF THE PREFERRED EMBODIMENTS

Figure 1:
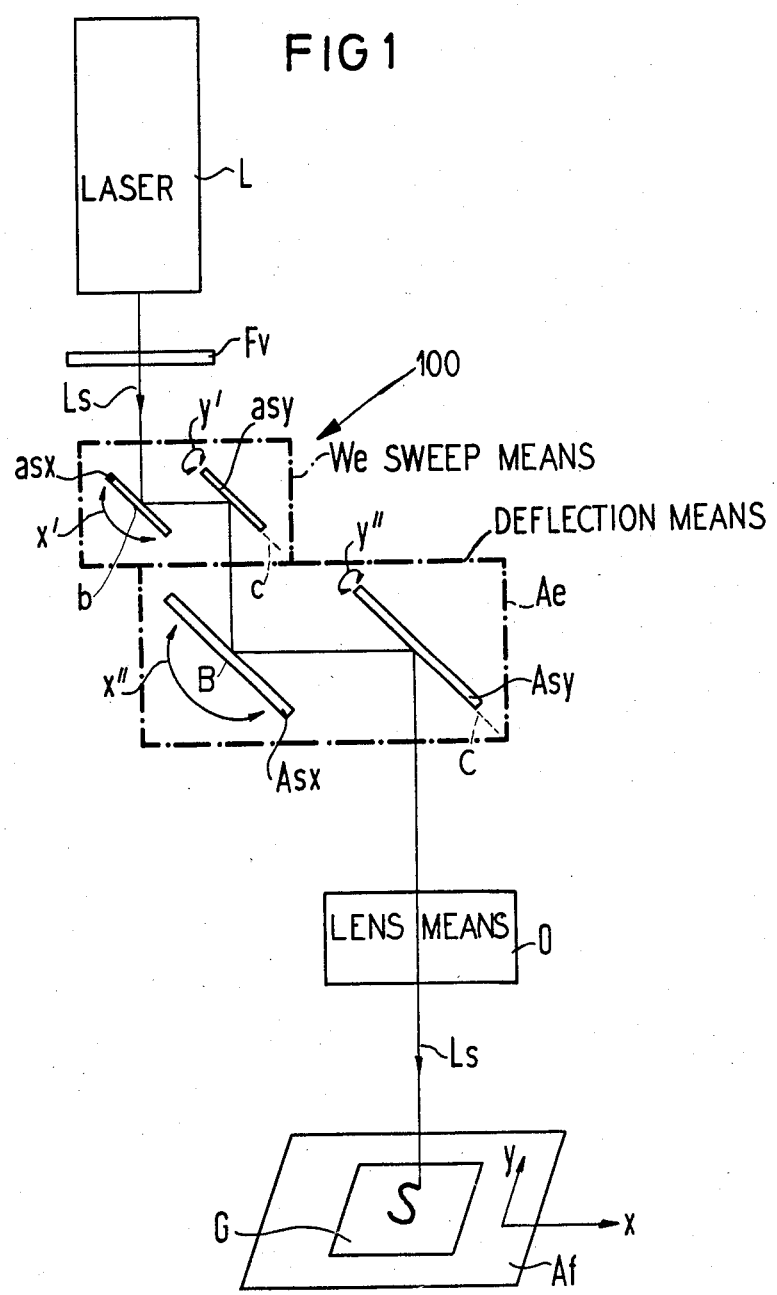
FIG. 1 is a diagrammatic illustration of an apparatus in accordance with the present invention.

The principles of the present invention are particularly useful in a labeling apparatus diagrammatically illustrated and generally indicated at 100 in FIG. 1 for laser labeling of an article G which is disposed on a work surface Af. The apparatus 100 comprises of a laser L, which generates a laser beam Ls. A photographic shutter Fv is disposed in the beam path of the laser beam Ls. The laser beam Ls after passing through the photographic shutter Fv enters a sweep device or means We, then goes to a deflecting device Ae, through lens means that is formed by an objective 0, which focuses the laser beam Ls onto the surface of the article G, which is to be labeled. The position of the article G on the work surface As is thereby defined with reference to a planar, Cartesian coordinate system x, y.

The sweep device or means We has the task of periodically deflecting laser beam Ls in both the horizontal direction x and in a vertical direction y with a prescribable amplitude so that it describes a circle on the surface of the article G. The diameter of this circle will define the line thickness during labeling. Accordingly, the sweep device We is composed of two rotatable deflecting mirrors asx and asy which are inserted successively into the beam path of the laser beam Ls. The deflecting mirror asx is rotatable in the direction of the double arrow x' on an axis b to deflect the laser beam Ls in the x-direction. The deflecting mirror asy is rotatable on an axis c in the direction of a double arrow y' for deflecting the laser beam Ls in the y-direction. The two deflecting mirrors asx and asy are each extremely small galvanometer mirrors which allow a sweep of the laser beam with a sweep frequency of at least 500 Hz. To this end, the coil of the deflecting mirror asx is supplied with an alternating voltage $Ux = \sin \omega t$, whereas the coil for the deflecting mirror asy is supplied with an alternating voltage $Uy = \sin(\omega t + \alpha)$ which voltage is phase-shifted thereto by an angle $\alpha$. The angle $\alpha$ is set with the assistance of a potentiometer that the laser beam Ls describes a circle on the surface of the article G, whereby the size of the angle $\alpha$ required for this purpose does not amount exactly to 90° in order to compensate for distortions.

The deflection device or means Ae has the job of deflecting the swept laser beam Ls in the horizontal direction x and in the vertical direction y, whereby significantly greater deflection angles are required than in the case of the sweep means We. Accordingly, the deflection device Ae is composed of two deflecting mirrors Asx and Asy successively inserted into the beam path of the swept laser beam Ls, whereby the deflecting mirror Asx is rotatable around an axis B in the direction of double arrow x" for deflecting the swept laser beam Ls in the x-direction In a similar manner, the deflecting mirror Asy is rotatable around an axis C in the direction of the double arrow y" for deflecting of the swept laser beam Ls in the y-direction. The two deflecting mirrors Asx and Asy are a matter of galvanometer mirrors whose size are adapted to the required deflection angles. The control for the deflecting mirrors Asx and Asy in accord with the respective labeling job occurs, for example, by means of a process control computer or by means of a microprocessor which are conventional for known labeling devices.

It should be noted, that the axis B and b each are perpendicular to the plane of the drawing of FIG. 1, whereas the axes C and c lie in the plane of drawing of FIG. 1.

Figure 2:
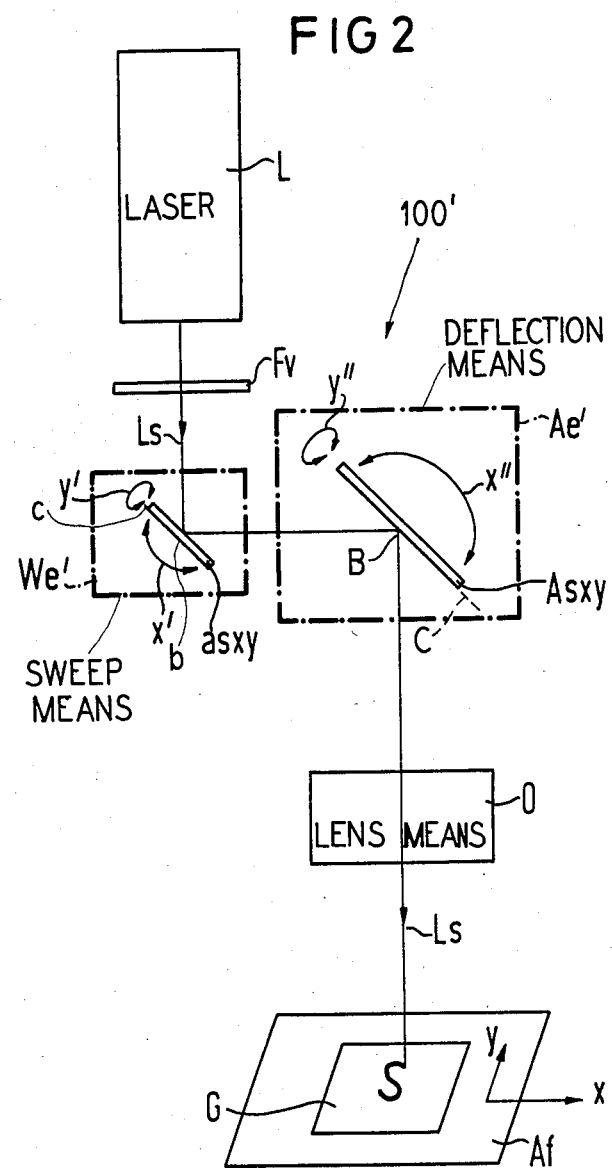
FIG. 2 is a diagrammatic illustration of an embodiment of the apparatus in accordance with the present invention.

A modification of the apparatus or device is generally indicated at 100' in FIG. 2. The apparatus 100' is different from the apparatus 100 only on the basis of different embodiments for the sweep means We' and the deflection means Ae'. The sweep means We' is composed of a single deflecting mirror asxy which is rotatable around an axis b in the direction of the double arrow x' for deflection of the laser beam Ls in the x-direction and is also independently rotatable around an axis c in the direction of double arrow y' for deflection of laser beam Ls in the y-direction. The sweeping of the laser beam Ls occurs via corresponding galvanometer drives of the deflecting mirror asxy in a fashion already described in relation with the sweep means We of FIG. 1.

The deflection means Ae' is also composed of a single deflecting mirror Asxy which, is rotatable around an axis B in the direction of the double arrow x" for deflection of the swept laser beam Ls in the x-direction and is independently rotatable around an axis C in the direction of the double arrow y" for deflection of the swept laser beam Ls in the y-direction. The deflection of the swept laser beam Ls occurs via corresponding galvanometer drives of the deflecting mirror Asxy, which in accordance with respective labeling job are controllable, for example, by a process control computer or the microprocessor which as mentioned hereinabove are conventional for labeling apparatuses.

Figure 3:
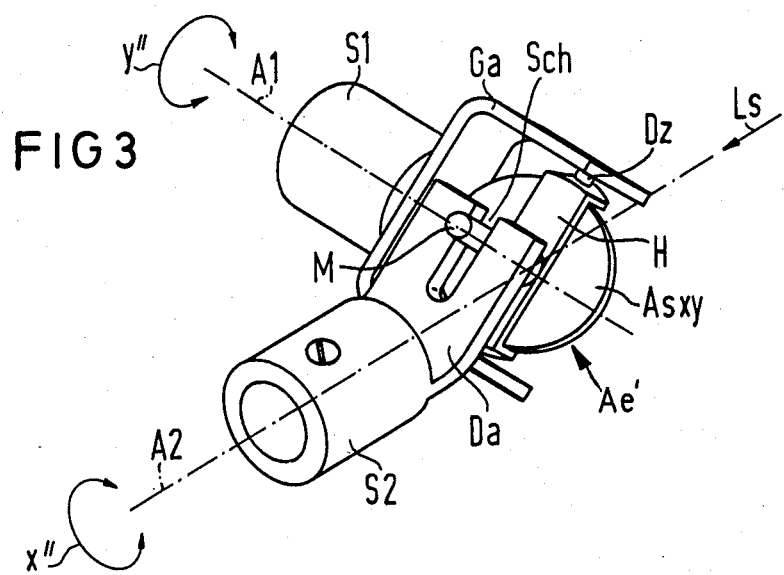
FIG. 3 is a perspective view of a deflection device utilizing the apparatus of FIG. 2.

The structural design of the deflection means Ae' with the deflecting mirror Asxy is best illustrated in FIG. 3. It may be seen therein that a first rotatable spindle S1 which is designed as a hollow shaft stub carries a fork Ga in which a mount H is rotatably seated via trunnions Dz. The back side of the circular deflecting mirror Asxy is glued to the mount H. The fork G and the mount H with the two trunnions Dz form a fork joint which is fastened so that an axis A1 of the first spindle S1 and the trunnion axis (not shown in detail) are perpendicular to one another.

The second rotatable spindle S2 likewise is a hollow shaft stub and is aligned with its axis A2 being perpendicular to the axis A1 and proceeds precisely through the intersection of the axis A1 and the trunnion axis. The deflection of the deflecting mirror Asxy at the second spindle S2 occurs via a pivot arm Da which is a flattened portion of a rod that is rigidly connected to the front end of the second spindle S2 and is inclined at an angle of 45° relative to the axis A2 of the second spindle S2. The pivot arm Da has a slot Sch that is open to the free end of the arm Da. The center plane of this slot Sch lies in the plane proceeding through the axis A2 and the slot receives a dog M which is formed of a straight, prismatic round rod whose diameter is only slightly smaller than the width of the slot Sch. Moreover, the dog M is aligned with relation to the mirror surface of the deflecting mirror Asxy that its longitudinal axis proceeds through the common intersection of the axis A1, A2 and the trunnion axis.

The laser beam Ls to be deflected is aligned such that it impinges the mirror surface of the deflecting mirror Asxy in the direction of the axis A2 at the intersection of the axes A1 and A2 and in the initial position is deflected down by an angle of 90°. Given a rotation of the first spindle S1 in the direction of the double arrow y", a corresponding deflection in the y-direction will occur with dog M moving in the slot Sch without transmitting torque or movement to the spindle S2. Given a rotation of the second spindle S2 in the direction of the double arrow x", the rotation of the deflecting mirrow Asxy around the trunnion axis with a corresponding excursion of a laser beam Ls in the x-direction will occur via the pivot arm Da and the dog M. However, torque is likewise not transmitted to the spindle S1 during this operation. A simultaneous rotation of the spindles S1 and S2 leads to a corresponding x-curve and y-curve in the plane of the work surface Af. The controlled rotation of the spindle S1 and S2 therefore occurs via the galvanometer drives which are not shown in FIG. 2.

Sweep means We' comprising the deflecting mirror asxy shown in FIG. 2 is structurally designed exactly in the same fashion as deflection means Ae' which has deflecting mirror Asxy shown in FIG. 3. However, the sweep device We' has a significantly smaller structural size.

Figure 4:
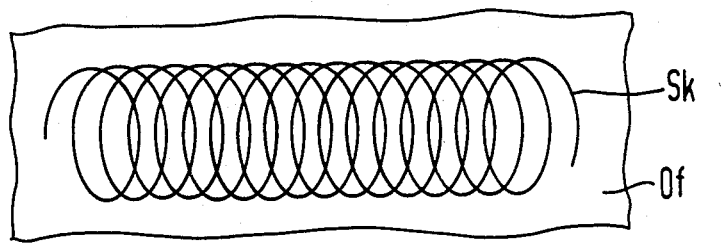
FIG. 4 is an enlarged view of the path of the swept beam in accordance with the present invention.
Figure 5:
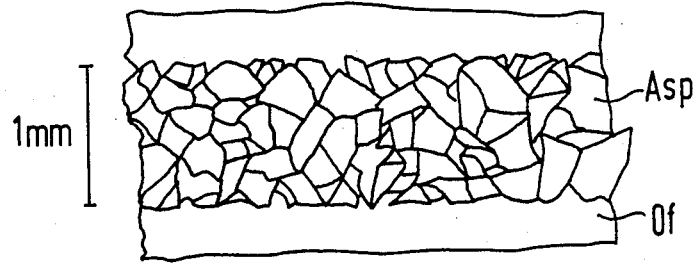
FIG. 5 is an enlarged view of an erosion track of the laser beam on the surface of a glass article.

With the operation of the sweep means of the device 100 or 100', the swept laser beam will move in a circle and if the deflecting means moves in a straight line, then a track Sk which has a looped curve will be formed on a surface of the article G. The laser L shown in FIG. 1 is a pulsed $CO_2$ laser having a emission wavelength of 10.6 $\mu$m and an overall output power of 8 watts. The laser beam Ls generated by the $CO_2$ laser is swept in such a sweep means We that it describes a circle having a diameter of 1 mm on the surface of the article G, whereby the sweep frequency amounts to 600 Hz. When a write motion is then superimposed on this sweep of the laser beam Ls by the deflection means Ae, then a looped curve or track Sk shown in FIG. 4 will occur on the surface of the article G as a track of the laser beam Ls. This looped curve or track Sk, which is shown extended in the horizontal writing direction in FIG. 4, is, in fact, significantly tighter given the specific swept sweep frequency of 600 Hz and given a writing speed of 200 mm per second and is fashioned with so many overlaps that at least the center region of the character stroke of the surface of is swept three times by the laser Ls within a short time. This multiple sweep is thereby of decisive significance for the quality of the character stroke to be generated. Due to the influence of the laser beam Ls on the surface of, the erosion track Asp (FIG. 5) will arise. This erosion track forms a character stroke with a line thickness of 1 mm. As may be seen, the erosion track Asp is formed in that a plurality of micro-cracks arise on the surface Of, whereby these micro-cracks form a surprisingly sharp edge of the erosion track Asp. The optical appearance image of the erosion track Asp shown in FIG. 5 roughly corresponds to the optical appearance image of a stroke etched into the surface of a glass article with the assistance of hydrofluoric acid.

Although various minor modifications may be suggested by those versed in the art, it should be understood that I wish to embody within the scope of the patent granted hereon all such modifications that reasonably and properly come within the scope of my contribution to the art.

I claim:

1. An apparatus for non-contacting modification of a surface of a glass article by forming a label thereon, said apparatus comprising a laser creating a laser beam, separate sweep means being disposed in the path of the laser beam for creating a swept beam moving in two different directions at right angles to each other with a seeep frequency of a least 500 Hz for each of the two directions, said sweep means being composed of two deflecting mirrors arranged in succession in the path of the laser beam and being mounted on two different axes, said mirrors being rotatable at different sweep frequencies, separate deflecting means having two deflecting mirrors rotatable on two different axes being disposed in the path of the swept beam for directing the beam in two different directions as a labeling beam moving in a desired path and lens means for directing the labeling beam onto the surface of the glass article to create a label thereon.

2. An apparatus according to claim 1, wherein the sweep means includes adjustment means enabling adjustment of the sweep beam to describe a circle on the surface of the glass article.

3. An apparatus according to claim 2, wherein the adjustment means enable obtaining a diameter of the circle to be at least 0.5 mm.

4. An apparatus according to claim 3, wherein the adjustment means enables the diameter of the circle to be set at 1 mm.

5. An apparatus according to claim 3, wherein the sweep means includes adjustment means for adjusting the path of the sweep beam to describe a circle on the surface of the article.

6. An apparatus according to claim 5, wherein the adjustment means describes a circle with a diameter of at least 0.5 mm.

7. An apparatus according to claim 6, wherein the adjustment means enables the sweep beam to describe a circle having a diameter of 1 mm.

8. An apparatus for non-contacting modification of a surface of a glass article by forming a label thereon, said apparatus comprising a laser creating a laser beam; sweep means being disposed in the path of the laser beam for creating a swept beam, said sweep means including a single deflecting mirror rotatable about two mutually independent, different directions with different sweep frequencies and mounting member for mounting the single deflecting mirror, said mounting member being mounted for rotation about a first axis on a cradle, said cradle being rotatable around a second axis extending perpendicular to said first axis, a spindle member mounted for rotation about a third axis intersecting the first and second axes and perpendicular to said second axis, said spindle member having an end plate extending at 45° to the third axis and having a slot lying in the plane formed by the first and third axes, said slot receiving a pin provided on the mounting member on a fourth axis passing through the intersection of the first, second and third axes, separate deflecting means being disposed in the path of the swept beam for creating a labeling beam moving in a desired path and lens means for directing the labeling beam onto the surface of the glass article to create a label thereon.

9. An apparatus according to claim 8, wherein the sweep frequencies are set to be at least 500 Hz.

10. An apparatus for non-contacting modification of a surface of a glass article by forming a label thereon, said apparatus comprising a laser creating a laser beam, separate sweep means being disposed in the path of the laser beam for creating a swept beam moving in two different directions at right angles to each other with a sweep frequency of at least 500 Hz of a single deflection mirror rotatable about two mutually independent, different axes with different sweep frequencies, separate deflecting means comprising a single deflecting mirror rotatable on two different axes being disposed in the path of the swept beam for directing the beam in two different directions as a labeling beam moving in a desired path and lens means for directing the labeling beam onto the surface of the glass article to create a label thereon.

* * * * *